United States Patent
Anderson et al.

(10) Patent No.: US 6,993,583 B2
(45) Date of Patent: Jan. 31, 2006

(54) DYNAMICALLY SHARING A POOL OF IP ADDRESSES

(75) Inventors: Jeffrey Wayne Anderson, Fayetteville, NC (US); Travis Daren Appleman, Raleigh, NC (US); William W. Buchanan, Wake Forest, NC (US); Simon Chu, Chapel Hill, NC (US); David Michael Green, Hillsborough, NC (US); William Joseph Piazza, Holly Springs, NC (US); Karl Ross Shultz, Cary, NC (US); Paul Brian Tippett, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 830 days.

(21) Appl. No.: 10/085,329

(22) Filed: Feb. 28, 2002

(65) Prior Publication Data

US 2003/0163584 A1     Aug. 28, 2003

(51) Int. Cl.
 *G06F 15/173*     (2006.01)
 *G06F 15/16*      (2006.01)

(52) U.S. Cl. .................. 709/226; 709/227; 709/228; 709/229

(58) Field of Classification Search ............... 709/203, 709/220, 226, 227, 228, 229
See application file for complete search history.

(56) References Cited

U.S. PATENT DOCUMENTS

| | | | | |
|---|---|---|---|---|
| 5,812,819 A | | 9/1998 | Rodwin et al. ............. 395/500 |
| 5,884,024 A | * | 3/1999 | Lim et al. .................... 713/201 |
| 6,052,725 A | | 4/2000 | McCann et al. ............. 709/223 |
| 6,233,616 B1 | | 5/2001 | Reid ............................ 709/225 |
| 6,243,749 B1 | * | 6/2001 | Sitaraman et al. .......... 709/223 |
| 6,256,671 B1 | * | 7/2001 | Strentzsch et al. .......... 709/227 |
| 6,331,984 B1 | * | 12/2001 | Luciani ....................... 370/401 |
| 6,381,650 B1 | * | 4/2002 | Peacock ..................... 709/245 |
| 6,405,252 B1 | * | 6/2002 | Gupta et al. ................. 709/224 |
| 6,427,170 B1 | * | 7/2002 | Sitaraman et al. .......... 709/226 |
| 6,611,861 B1 | * | 8/2003 | Schairer et al. ............. 709/217 |
| 6,618,757 B1 | * | 9/2003 | Babbitt et al. .............. 709/226 |
| 2001/0039585 A1 | * | 11/2001 | Primak et al. .............. 709/228 |
| 2001/0047415 A1 | * | 11/2001 | Skene et al. ................. 709/226 |
| 2001/0049741 A1 | * | 12/2001 | Skene et al. ................. 709/232 |
| 2003/0055979 A1 | * | 3/2003 | Cooley ....................... 709/227 |

\* cited by examiner

*Primary Examiner*—William Cuchlinski
*Assistant Examiner*—Yemane Mesfin Gerezgiher
(74) *Attorney, Agent, or Firm*—Robert A. Voigt, Jr.; Winstead Sechrest & Minick PC; Martin J. McKinley

(57) ABSTRACT

A method, system and computer program product for dynamically sharing a limited supply of Internet Protocol (IP) addresses among a larger number of servers. A manager coupled between the Internet and a plurality of servers may receive a request for an IP address associated with a domain name from a client coupled to the Internet. The manager may be configured to map the domain name into an IP address assigned to the server hosting the web site of the domain name. Each assigned IP address may be valid only for a limited time. Once the time the assigned IP address is valid has expired, the assigned IP address may be returned to the pool of available IP addresses thereby allowing a smaller number of IP addresses to be dynamically shared among a larger number of servers.

69 Claims, 8 Drawing Sheets

DYNAMICALLY SHARING A POOL OF IP ADDRESSES

TECHNICAL FIELD

The present invention relates to the field of hosting Internet web sites, and more particularly to dynamically sharing a limited supply of Internet Protocol (IP) addresses among a larger number of servers.

BACKGROUND INFORMATION

Many businesses today are capitalizing on the marketing potential of the quickly expanding Internet by providing web sites that are accessible to users on the Internet. Most of these businesses, however, do not have the funding, expertise or desire to purchase required hardware and software and to set-up and maintain these web sites. These businesses typically turn to companies, such as Internet Service Providers (ISPs), that provide hosting capabilities along with the required technical expertise and equipment to host the business applications, i.e., software used to run a web site.

The maintaining or running of a web site may commonly be referred to as web site hosting. Web site hosting may be provided by a server or a group of servers within a server farm (large grouping of interconnected servers) to host web sites that provide the particular service of a web site owner. Most businesses utilize the ISP to provide and support their specific Internet applications on a server, which is owned by the ISP.

A server farm may be connected to the Internet where one or more of the servers in the server farm each host a business application. A user may access the Internet through a computer commonly referred to as a client. The client may be coupled to the Internet and may be utilized by a user to access the Internet and browse or interact with the application hosted by one or more of the servers in the server farm. The client may communicate with a server in the server farm and vice-versa based upon a suite of communication protocols known as Transmission Control Protocol/Internet Protocol (TCP/IP).

ISPs typically provide a separate server or group of servers for each business application hosted. Multiple servers (or server groups) with different applications are controlled by an ISP and make up the server farm which is "plugged" into the Internet. Each server in the server farm may be assigned a unique Internet Protocol (IP) address for the lifetime of the server.

The Internet Protocol (IP) address may refer to the network address of the server that is mapped from the domain name entered by the user. For example, a user desiring to access the web site ibm.com may enter the domain name of ibm.com via a browser, e.g., Internet Explorer™, on the client. The domain name ibm.com may then be mapped to a network address of 9.67.111.80 that identifies the particular server hosting the web site ibm.com. This may commonly be referred to as address resolution. Address resolution must be done before the client is connected to the server hosting the web site to be accessed by the client. Commonly, the name resolution information may be stored in a name resolution master file of a server commonly referred to as a domain name server (DNS). That is, the DNS may be used to map the domain name entered by the user to the IP address associated with the server hosting the web site of the domain name.

As stated above, each server in the server farm operated by an ISP is assigned a unique IP address. As the number of servers operated by the ISP to host web sites increases, the larger the number of IP addresses are required. However, only a limited supply of IP addresses are available to be assigned to the expanding number of servers operated by the ISPs.

It would therefore be desirable to dynamically share a limited supply of Internet Protocol (IP) addresses among a larger number of servers.

SUMMARY

The problems outlined above may at least in part be solved in some embodiments by limiting the time an Internet Protocol (IP) address assigned to a particular server is valid. Once the time the assigned IP address is valid has expired, the assigned IP address may be returned to the pool of available IP addresses thereby allowing a smaller number of IP addresses to be dynamically shared among a larger number of servers.

In one embodiment of the present invention, a method for dynamically sharing a limited supply of IP addresses among a larger number of servers may comprise the step of a manager coupled between the Internet and a plurality of servers receiving a request for an IP address associated with a particular domain name from a client coupled to the Internet. The manager may be configured to map a domain name entered by a user of the client into the IP address assigned to the server hosting the web site of the domain name as discussed below.

Upon receiving a request for an IP address associated with a particular domain name, the manager may search a table comprising a listing of IP addresses along with their associated domain names. A determination may be made by the manager as to whether the domain name, e.g., domain1.com, entered by the user of the client was assigned an IP address.

If the domain name, e.g., domain3.com, entered by the user of the client was not assigned an IP address, then the manager may select an IP address from one or more available IP addresses in the table. The table may then be updated indicating that the selected IP address, e.g., IP address 9.37.5.158, is no longer available. Furthermore, the table may be updated to indicate the period of time, e.g., 200 seconds, the selected IP address, IP address 9.37.5.158, is valid. This may commonly be referred to as the "time to live." Upon expiration of the IP address, the IP address may be returned to the pool of available IP addresses. By limiting the time an IP address is valid, IP addresses may be dynamically shared among a larger number of servers. Upon assigning an IP address, e.g., IP address 9.37.5.129, to a particular server, a background process may be performed by the manager to monitor the time to expire for each assigned IP address in order to maintain an adequate number of available IP addresses. Other background processes may be performed by the manager in order to maintain an adequate number of available IP addresses such as by adjusting the time one or more IP addresses are valid or by adjusting the time an IP address is valid based on the number of requests received by the server assigned that IP address. Further, the table may be updated to indicate the particular server that is assigned the selected IP address, e.g., IP address 9.37.5.158, since it hosts the web site for the domain name, e.g., domain3.com, entered by the user of the client. Further, the table may be updated to indicate the non-routable IP address, e.g., 10.1.1.14, for the server assigned the selected IP address. A non-routable IP address may refer to an IP address that the manager uses to communicate with a server. The non-routable IP address may only be used by the manager and not the client. Hence, the non-routable IP address may be invisible to the client. Further, since the non-routable IP addresses are invisible to the client, there is an unlimited supply of non-routable IP addresses. The manager may then be able to assign a non-routable IP address for each server.

Upon selecting an IP address, the selected IP address, e.g., IP address 9.37.5.158, along with the period of time, e.g., 200 seconds, the selected IP address, e.g., IP address 9.37.5.158, is valid may be transmitted to the client that transmitted the request for an IP address.

As stated above, a determination may be made by the manager as to whether the domain name, e.g., domain1.com, entered by the user of the client was assigned an IP address. If the domain name, e.g., domain1.com, entered by the user of the client was assigned an IP address, e.g., IP address 9.37.5.129, then a determination may be made as to whether the domain name entered by the user of the client was assigned multiple IP addresses.

If the domain name, e.g., domain1.com, entered by the user of the client was assigned only a single IP address, e.g., IP address 9.37.5.129, then the period of time the assigned IP address is valid may be adjusted. For example, the period of time to expire may be adjusted by increasing an additional period of time, e.g., 60 seconds, to the period of time set to expire, e.g., 200 seconds, for the IP address. Upon expiration of the IP address, the IP address may be returned to the pool of available IP addresses. By limiting the time an IP address is valid, IP addresses may be dynamically shared among a larger number of servers. As stated above, upon assigning an IP address, e.g., IP address 9.37.5.129, to a particular server, a background process may be performed by the manager to monitor the time to expire for each assigned IP address in order to maintain an adequate number of available IP addresses as discussed. Other background processes may be performed by the manager in order to maintain an adequate number of available IP addresses such as by adjusting the time one or more IP addresses are valid or by adjusting the time an IP address is valid based on the number of requests received by the server assigned that IP address.

The manager may then transmit the IP address, e.g., IP address 9.37.5.129, assigned to the server that hosts the web site for the domain name entered by the user of the client as well as the adjusted period of time, e.g., 260 seconds, the IP address, e.g., IP address 9.37.5.129, is valid.

As stated above, a determination may be as to whether the domain name entered by the user of the client was assigned multiple IP addresses. If the domain name, e.g., domain1.com, entered by the user of the client was assigned multiple IP addresses, e.g., IP addresses 9.37.5.130, 9.37.5.142, then one of the multiple IP addresses may be selected based on the load of the servers that host the web site of the domain name, e.g., domain2.com, entered by the user. That is, one of the multiple IP addresses may be selected based on the number of requests issued to each server that hosts the web site of the domain name, e.g., domain2.com, entered by the user of the client. The IP address, e.g., IP address 9.37.5.130, assigned to the server that receives the least number of requests may be selected. The period of time to expire for the selected IP address, e.g., IP address 9.37.5.130, may then be adjusted by increasing an additional period of time, e.g., 60 seconds, to the period of time set to expire, e.g., 78 seconds, for the selected IP address. It is noted that upon expiration of the selected IP address, e.g., IP address 9.37.5.130, the selected IP address may be returned to the pool of available IP addresses. By limiting the time an IP address is valid, IP addresses may be dynamically shared among a larger number of servers. It is further noted that upon assigning an IP address, e.g., IP address 9.37.5.130, to a particular server, a background process may be performed by the manager to monitor the time to expire for each assigned IP address in order to maintain an adequate number of available IP addresses. Other background processes may be performed by the manager in order to maintain an adequate number of available IP addresses such as by adjusting the time one or more IP addresses are valid or by adjusting the time an IP address is valid based on the number of requests received by the server assigned that IP address.

The manager may then transmit the selected IP address, e.g., IP address 9.37.5.130, assigned to the server that hosts the web site for the domain name, e.g., domain2.com, entered by the user of the client as well as the adjusted period of time, e.g., 138 seconds, that the selected IP address, e.g., IP address 9.37.5.130, is valid.

Upon transmitting an IP address along with the period of time the transmitted IP address has till it expires as described above, the manager may receive a request to access the server hosting the web site of the domain name, e.g., domain1.com, entered by the user of the client along with the assigned IP address, e.g., IP address 9.37.5.129. The request may comprise the address of the client that issued the request. The manager may then translate the IP address, e.g., IP address 9.37.5.129, assigned to the server hosting the web site of the domain name, e.g., domain1.com, entered by the user of the client to the corresponding non-routable IP address, e.g., IP address 10.1.1.11.

The manager may receive a packet of data for reading and executing web pages along with the non-routable IP address, e.g., IP address 10.1.1.11, assigned to server hosting the web site for the domain name, e.g., domain1.com, entered by the user of the client from that server. The packet of data may further comprise the source address used for identifying which client is to receive the packet of data. The manager may then translate the non-routable IP address, e.g., IP address 10.1.1.11, assigned to the server hosting the web site of the domain name, e.g., domain1.com, entered by the user of the client to the corresponding routable IP address, e.g., IP address 9.37.5.129. The packet of data along with the routable IP address, e.g., IP address 9.37.5.129, assigned to the server that hosts the web site for the domain name, e.g., domain1.com, entered by the user of the client may be transmitted to the appropriate client based on the source address.

The foregoing has outlined rather broadly the features and technical advantages of one or more embodiments of the present invention in order that the detailed description of the invention that follows may be better understood. Additional features and advantages of the invention will be described hereinafter which form the subject of the claims of the invention.

BRIEF DESCRIPTION OF THE DRAWINGS

A better understanding of the present invention can be obtained when the following detailed description is considered in conjunction with the following drawings, in which.

DETAILED DESCRIPTION

Figure 1:
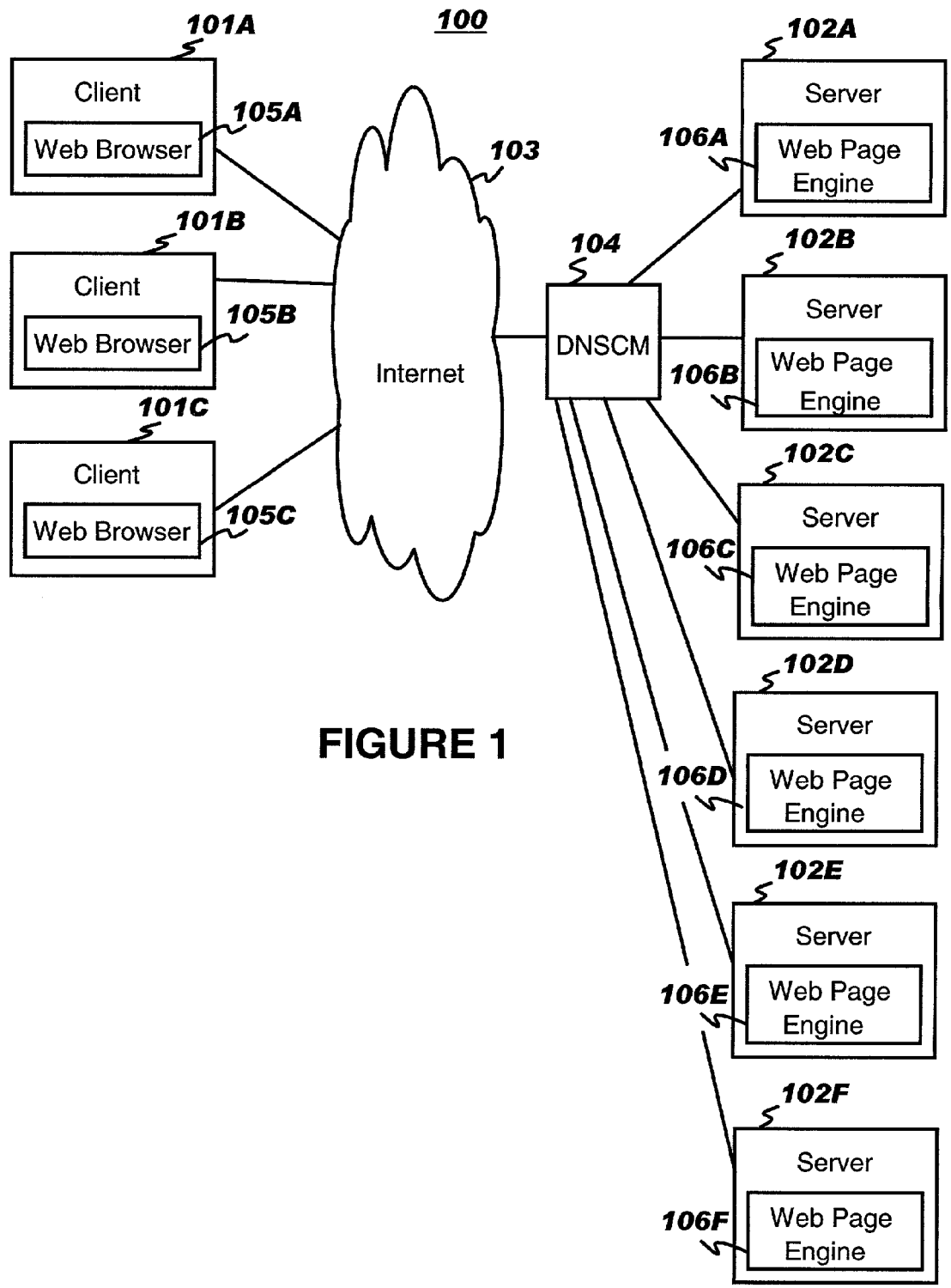
FIG. 1 illustrates a network system configured in accordance with the present invention.

FIG. 1—Network System

FIG. 1 illustrates an embodiment of a network system 100 in accordance with the present invention. Network system 100 may comprise one or more clients 101A–C coupled to one or more servers 102A–F via the Internet 103. Clients 101A–C may collectively or individually be referred to as clients 101 or client 101, respectively. Servers 102A–F may collectively or individually be referred to as servers 102 or server 102, respectively. In one embodiment, servers 102 may be interconnected to form a server farm. Network system 100 may further comprise a Domain Name Server Connection Manager (DNSCM) 104 coupled between the Internet 103 and servers 102. It is noted that the Internet 103 may refer to a collection of computers. It is further noted that network system 100 may comprise any number of clients 101 coupled to the Internet 103 to access a web site hosted by one or more servers 102. It is further noted that the connection between clients 101 and the Internet 103 may be any medium type, e.g., wireless, wired. It is further noted that clients 101 may be any type of device, e.g., wireless, Personal Digital Assistant (PDA), cell phone, personal computer system, workstation, Internet appliance, configured with the capability of communicating with server 102. It is further noted that network system 100 may be any type of system that has at least one server 102, at least one client 101 and a DNSCM 104 and that FIG. 1 is not to be limited in scope to any one particular embodiment.

Referring to FIG. 1, servers 102 may be configured to host one or more web sites. Servers 102A–F may each comprise a web page engine 106A–F, respectively. Web page engines 106A–F may collectively or individually be referred to as web page engines 106 or web page engine 106, respectively. Web page engine 106 may be configured to maintain and provide access to an Internet web page which is enabled to forward web pages to a web browser, e.g., web browser 105A, of client 101. Web pages are typically formatted as a markup language file, for example, HyperText Markup Language (HTML) or Extended Markup Language (XML). A more detailed description of server 102 is provided further below in conjunction with FIG. 3.

Clients 101A–C may be configured to access and/or interact with a particular web site hosted by server 102 via a web browser 105A–C, respectively. Web browsers 105A–C may collectively or individually be referred to as web browsers 105 or web browser 105, respectively. Web browser 105 may be configured for reading and interpreting web pages. While the illustrated client engine is a web browser 105, those skilled in the art will recognize that other client engines may be used in accordance with the principles of the present invention. Clients 101 may further be configured to send requests, e.g., requests for an Internet Protocol (IP) address associated with a domain name, to DNSCM 104 and receive data, e.g., packet of data for reading and executing web pages along with the IP address associated with the server hosting the web site, from DNSCM 104 as discussed in greater detail in FIG. 4. A more detailed description of client 110 is provided below in conjunction with FIG. 2.

DNSCM 104 may be configured to map a domain name entered by a user of client 101 via web browser 105 into the IP address assigned to the server hosting the web site of the domain name. DNSCM 104 may further be configured to dynamically share a limited supply of IP addresses among a larger number of servers 102 as discussed in greater detail in FIG. 4. DNSCM 104 may further be configured to perform several background processes to maintain an adequate supply of IP addresses to be assigned to servers as discussed in greater detail in FIGS. 5–7. A more detailed description of DNSCM 104 is provided further below in conjunction with FIG. 3.

Figure 2:
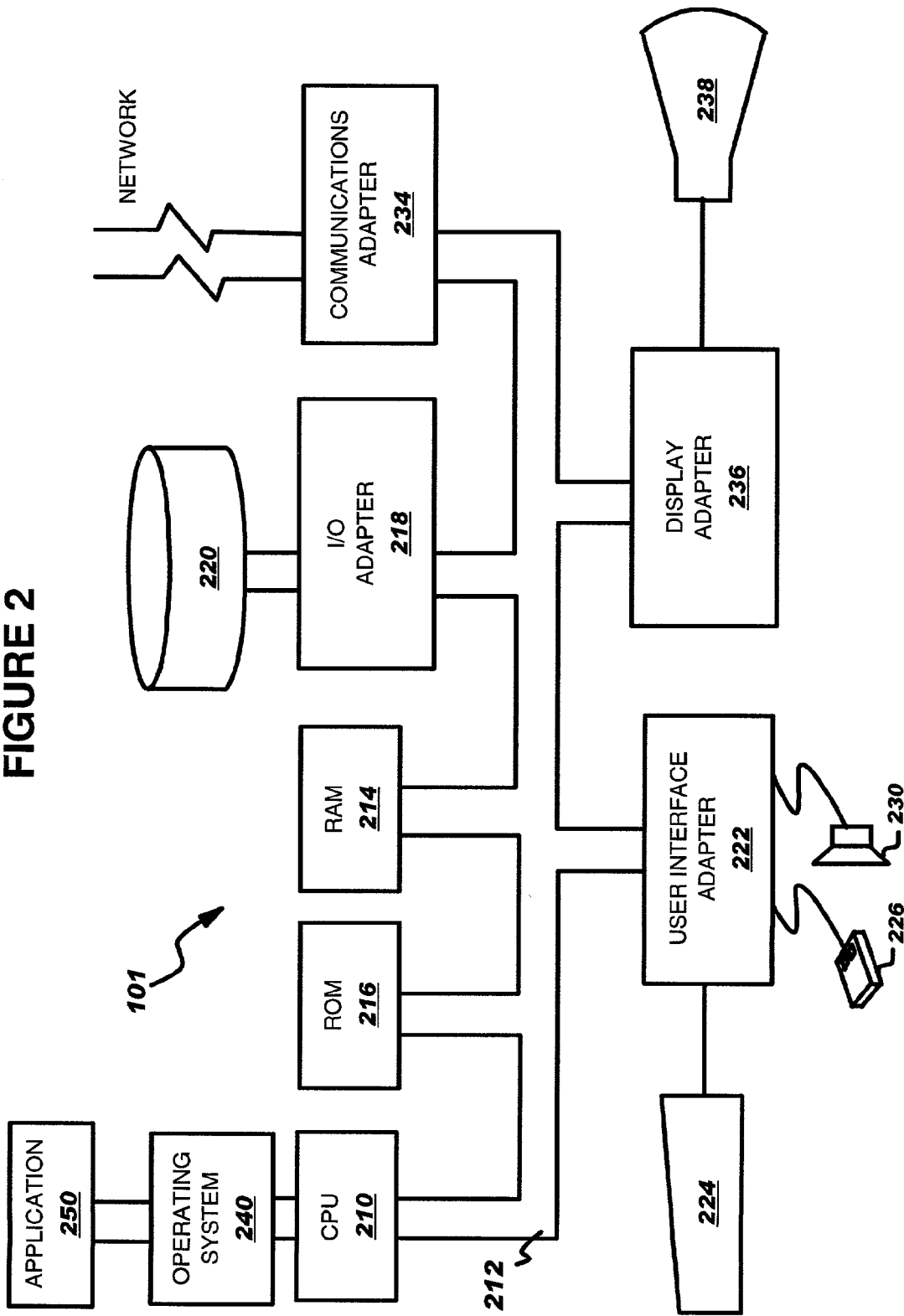
FIG. 2 illustrates an embodiment of the present invention of a client in the network system.

FIG. 2—Hardware Configuration of Client

FIG. 2 illustrates a typical hardware configuration of client 101 which is representative of a hardware environment for practicing the present invention. Client 101 may have a central processing unit (CPU) 210 coupled to various other components by system bus 212. An operating system 240, may run on CPU 210 and provide control and coordinate the functions of the various components of FIG. 2. An application 250 in accordance with the principles of the present invention may run in conjunction with operating system 240 and provide calls to operating system 240 where the calls implement the various functions or services to be performed by application 250. Application 250 may include, for example, web browser 105 for reading and interpreting web pages, a program for sending requests, e.g., requests for an Internet Protocol (IP) address associated with a domain name, to DNSCM 104 and receiving data, e.g., packet of data for reading and executing web pages along with the IP address associated with the server hosting the web site, from DNSCM 104 as discussed in FIG. 4. Read only memory (ROM) 216 may be coupled to system bus 212 and include a basic input/output system ("BIOS") that controls certain basic functions of client 101. Random access memory (RAM) 214, I/0 adapter 218, and communications adapter 234 may also coupled to system bus 212. It should be noted that software components including operating system 240 and application 250 may be loaded into RAM 214 which may be the computer system's main memory. I/O adapter 218 may be a small computer system interface ("SCSI") adapter that communicates with a disk unit 220, e.g., disk drive. It is noted that the program of the present invention that sends requests, e.g., requests for an Internet Protocol (IP) address associated with a domain name, to DNSCM 104 and receives data, e.g., packet of data for reading and executing web pages along with the IP address associated with the server hosting the web site, from DNSCM 104, as discussed in FIG. 4, may reside in disk unit 220 or in application 250.

Communications adapter 234 may interconnect bus 212 with the Internet 103 (FIG. 1) enabling client 101 to communicate with server 102 (FIG. 1) via DNSCM 104 (FIG. 1). Input/Output devices may also be connected to system bus 212 via a user interface adapter 222 and a display adapter 236. Keyboard 224, mouse 226 and speaker 230 may all be interconnected to bus 212 through user interface adapter 222. Event data may be inputted to client 101 through any of these devices. A display monitor 238 may be connected to system bus 212 by display adapter 236. In this manner, a user is capable of inputting, e.g., inputting a domain name, to client 101 through keyboard 224 or mouse 226 and receiving output from client 101 via display 238 or speaker 230.

Figure 3:
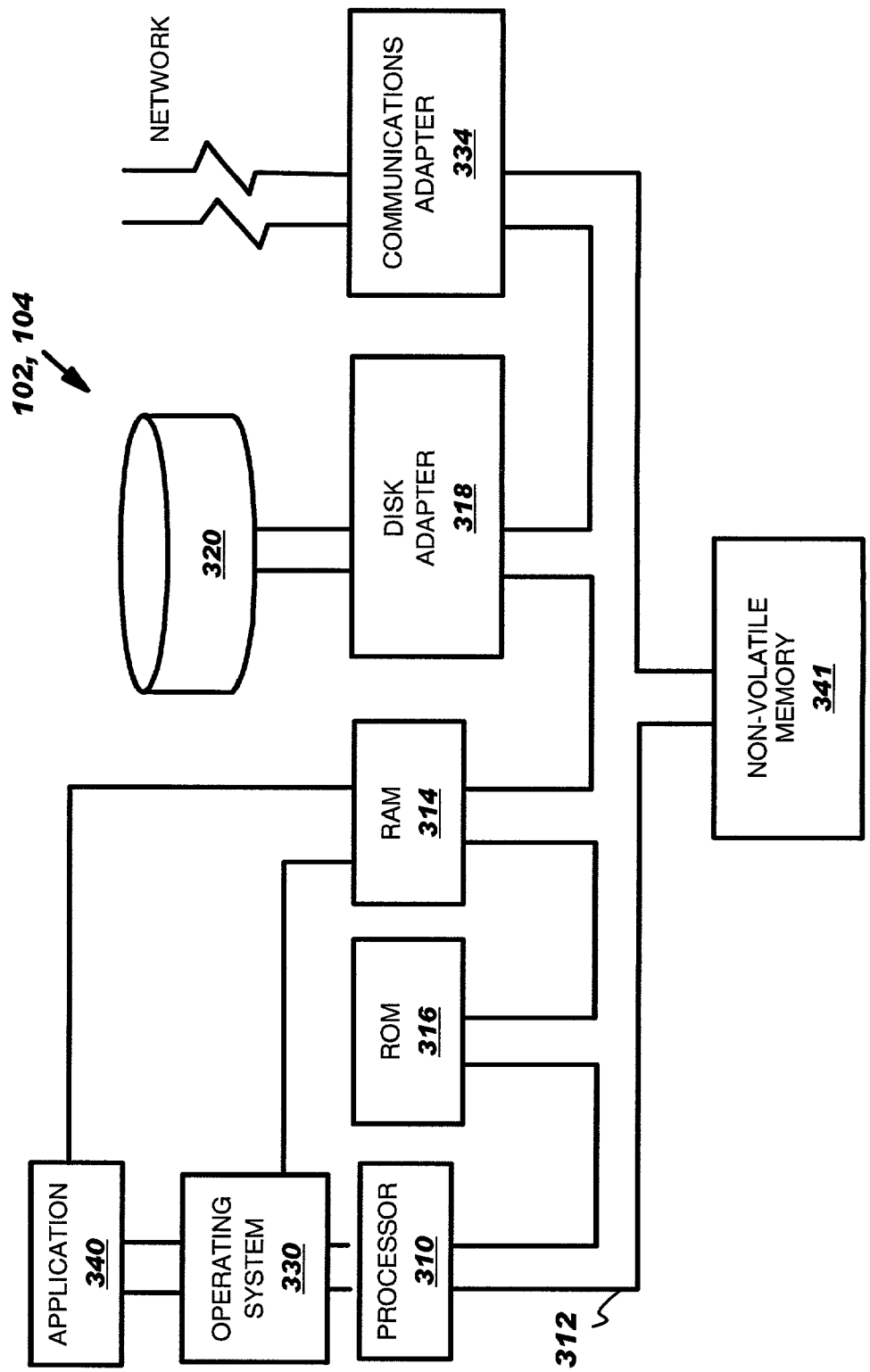
FIG. 3 illustrates an embodiment of the present invention of a server and a domain name server connection manager in the network system.

FIG. 3—Hardware Configuration of Server and DNSCM

FIG. 3 illustrates an embodiment of the present invention of server 102 (FIG. 1) and DNSCM 104 (FIG. 1). Referring to FIG. 3, server 102, DNSCM 104 may comprise a processor 310 coupled to various other components by system bus 312. An operating system 330 may run on processor 310 and provide control as well as coordinate the function of the various components of FIG. 3. An application 340 in accordance with the principles of the present invention may run in conjunction with operating system 330 and provide calls to operating system 330 where the calls implement the various functions or services to be performed by application 340. An application 340 for DNSCM 104 may include, for example, a program for dynamically sharing a limited supply of IP addresses among a larger number of servers 102 (FIG. 1) including background processes to maintain an adequate supply of IP addresses as described in FIGS. 4–7. An application 340 for server 102 may include, for example, a program for operating a web site. Read only memory (ROM) 316 may be coupled to system bus 312 and include a Basic Input/Output System ("BIOS") that controls certain basic functions of server 102. Random access memory (RAM) 314 and disk adapter 318 may also be coupled to system bus 312. It should be noted that software components including operating system 330 and application 340 may be loaded into RAM 314 which may be server's 102, DNSCM's 104 main memory. Disk adapter 318 may be an adapter that communicates with disk unit 320, e.g., disk drive. It is noted that the program of the present invention that dynamically shares a limited supply of IP addresses among a larger number of servers 102 (FIG. 1) including background processes to maintain an adequate supply of IP addresses as described in FIGS. 4–7 may reside in disk unit 320 or in application 340. It is further noted that the program of the present invention that operates a web site may reside in disk unit 320 or in application 340. Communications adapter 334 may also be coupled to system bus 312. Communications adapter 334 may interconnect bus 312 with an outside network enabling server 102, DNSCM 104 to communicate with client 101 via the Internet 103. Non-volatile memory 341 may also be coupled to system bus 312. Non-volatile memory 341 for DNSCM 104 may store a table comprising a listing of one or more IP addresses that are currently assigned to particular servers 102 and one or more IP addresses that are available to be assigned to particular servers 102 as explained in greater detail in conjunction with FIG. 4.

Implementations of the invention include implementations as a computer system programmed to execute the method or methods described herein, and as a computer program product. According to the computer system implementations, sets of instructions for executing the method or methods may be resident in the random access memory 314 of one or more computer systems configured generally as described above. Until required by DNSCM 104, server 102, the set of instructions may be stored as a computer program product in another computer memory, for example, in disk unit 320. Furthermore, the computer program product may also be stored at another computer and transmitted when desired to the user's workstation by a network or by an external network such as the Internet. One skilled in the art would appreciate that the physical storage of the sets of instructions physically changes the medium upon which it is stored so that the medium carries computer readable information. The change may be electrical, magnetic, chemical or some other physical change.

Figure 4:
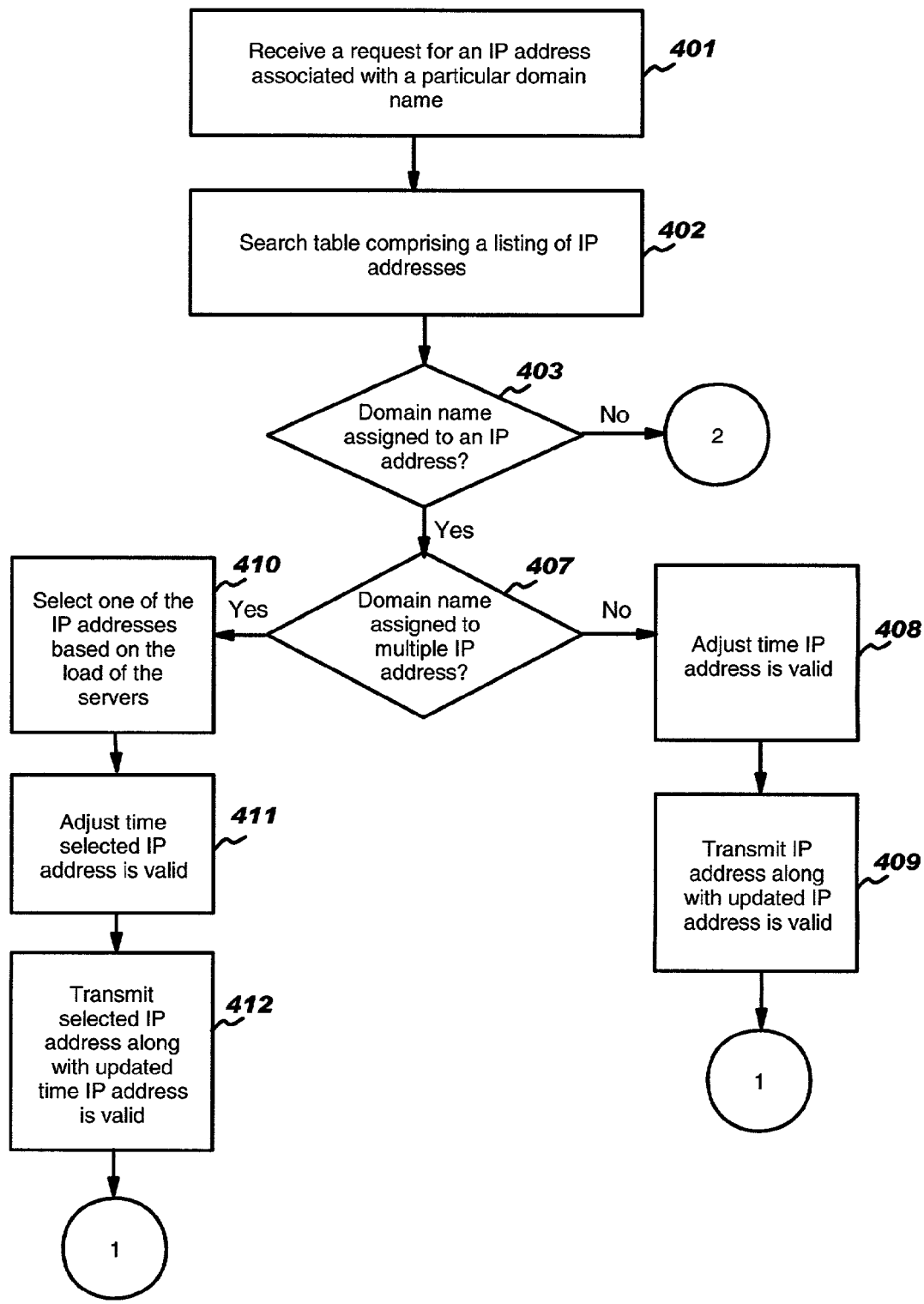
FIG. 4 is a flowchart of a method for dynamically sharing a limited supply of Internet Protocol (IP) address among a larger number of servers in accordance with the present invention.
Figure 4:
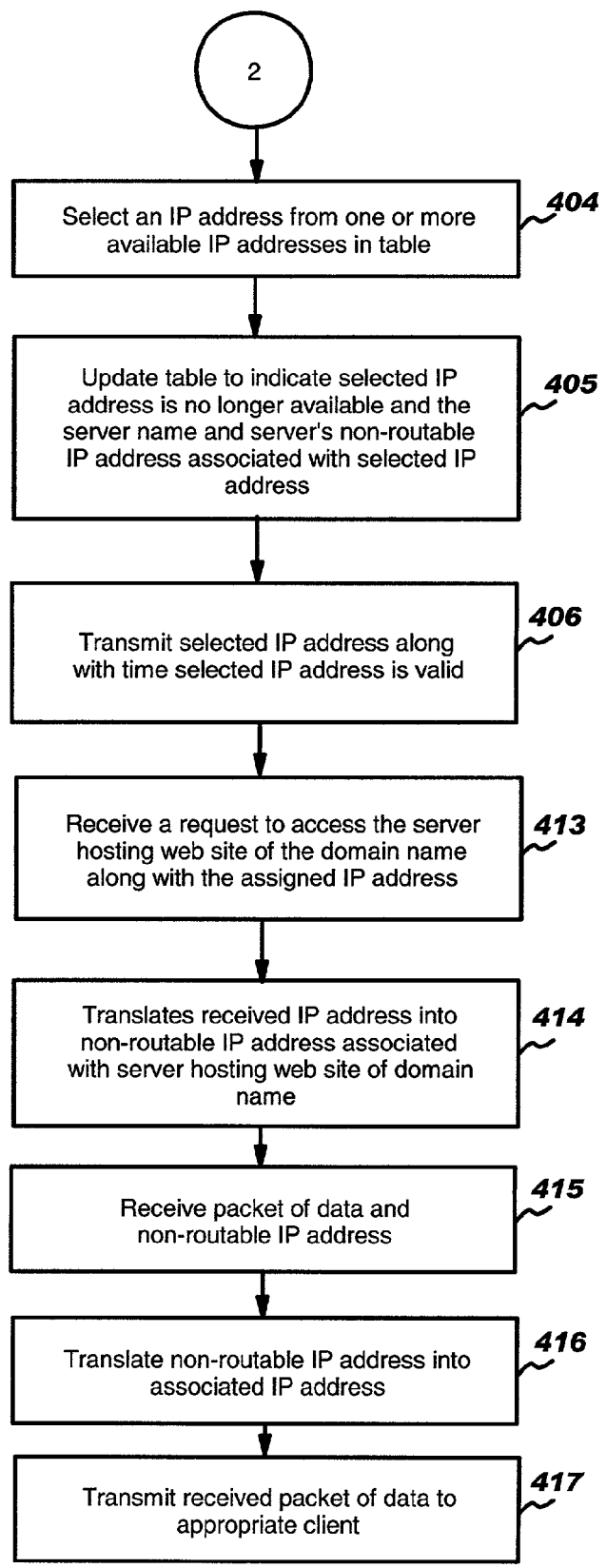

FIG. 4—Flowchart of a Method for Dynamically Sharing a Limited Supply of IP Addresses Among a Larger Number of Servers FIG. 4 is a flowchart of one embodiment of the present invention of a method 400 for dynamically sharing a limited supply of Internet Protocol (IP) addresses among a larger number of servers. As stated in the Background Information section, Internet Service Providers (ISPs) typically provide a separate server or group of servers for each business application hosted. Multiple servers (or server groups) with different applications are controlled by an ISP and make up the server farm which is "plugged" into the Internet. Each server in the server farm may be assigned a unique Internet Protocol (IP) address for the lifetime of the server. As the number of servers operated by the ISP to host web sites increases, the larger the number of IP addresses are required. However, only a limited supply of IP addresses are available to be assigned to the expanding number of servers operated by the ISPs. It would therefore be desirable to dynamically share a limited supply of Internet Protocol (IP) addresses among a larger number of servers. Method 400 is a method for dynamically sharing a limited supply of Internet Protocol (IP) addresses among a larger number of servers.

In step 401, DNSCM 104 (FIGS. 1 and 3) may receive a request for an IP address associated with a particular domain name entered by a user of client 101 (FIGS. 1 and 2) via web browser 105 (FIG. 1). For example, DNSCM 104 may receive a request for an IP address via Internet 103 from a user that entered the domain name of domain1.com via web browser 105 of client 101.

In step 402, DNSCM 104 may search a table comprising a listing of IP addresses along with their associated domain names as illustrated in the exemplary Table 1 below. In one embodiment, the table may be stored in non-volatile memory 341 (FIG. 3) of DNSCM 104.

TABLE 1

| IP Address | In-Use? | Time to Expire (seconds) | Server Assigned | Server's Non-Routable IP Address |
| --- | --- | --- | --- | --- |
| 9.37.5.129 | Yes | 200 | Server 102A hosts domain1.com | 10.1.1.11 |
| 9.37.5.130 | Yes | 78 | Server 102B hosts domain2.com | 10.1.1.12 |
| 9.37.5.142 | Yes | 60 | Server 102C hosts domain2.com | 10.1.1.13 |
| 9.37.5.158 | No | 0 | Null | Null |
| 9.37.5.160 | No | 0 | Null | Null |

Table 1 above illustrates an exemplary table listing of one or more IP addresses that are currently assigned to particular servers 102 and one or more IP addresses that are available to be assigned to particular servers 102. The first column of Table 1 may indicate a limited number of IP address. For example, Table 1 lists IP addresses 9.37.5.129, 9.37.5.130, 9.37.5.142, 9.37.5.158 and 9.37.5.160 which may be used for a greater number of servers 102, e.g., servers 102A–F. The second column of Table 1 may indicate whether the IP addresses are assigned to a particular server 102 or not. For example, IP address 9.37.5.129 is assigned to server 102, e.g., server 102A, hosting the web site for domain1.com. IP address 9.37.5.130 is assigned to server 102, e.g., server 102B, hosting the web site for domain2.com. IP address 9.37.5.142 is assigned to server 102, e.g., server 102C, hosting the web site for domain2.com. The third column of Table 1 may indicate the period of time such as in seconds an assigned IP address is valid. This may commonly be referred to as the "time to live." For example, IP address 9.37.5.129 may be valid for 200 seconds from the time of issuance. IP address 9.37.5.130 may be valid for 78 seconds from the time of issuance. IP address 9.37.5.142 may be valid for 60 seconds from the time of issuance. The fourth column of Table 1 may indicate the particular server 102, e.g., server 102A, that is assigned a particular IP address in-use. For example, server 102A may be assigned IP address 9.37.5.129 that hosts the web site for domain1.com. Server 102B may be assigned IP address 9.37.5.130 that hosts the web site for domain2.com. Server 102C may be assigned IP address 9.37.5.142 that hosts the web site for domain2.com. The fifth column of Table 1 may indicate a server's 102 non-routable IP address for servers 102 that been assigned an IP address in-use. For example, server 102A may be assigned a non-routable IP address of 10.1.1.11 by DNSCM 104. Server 102B may be assigned a non-routable IP address of 10.1.12 by DNSCM 104. Server 102C may be assigned a non-routable IP address of 10.1.13 by DNSCM 104. A non-routable IP address may refer to an IP address that DNSCM 104 uses to communicate with server 102. The non-routable IP address may only be used by DNSCM 104 and not client 101. Hence, the non-routable IP addresses may be invisible to client 101. Further, since the non-routable IP addresses are invisible to client 101, there is an unlimited supply of non-routable IP addresses. DNSCM 104 may then be able to assign a non-routable IP address for each server 102.

In step 403, a determination may be made by DNSCM 104 as to whether the domain name, e.g., domain1.com, entered by the user of client 101, e.g., client 101A, was assigned an IP address.

If the domain name, e.g., domain3.com, entered by the user of client 101, e.g., client 101A, was not assigned an IP address, then DNSCM 104, in step 404, may select an IP address from one or more available IP addresses in the table as illustrated in Table 1. For example, referring to Table 1, DNSCM 104 may select the next available IP address, e.g., IP address 9.37.5.158, that has not been assigned to a server 102.

In step 405, the table as illustrated in Table 1 may be updated indicating that the selected IP address, e.g., IP address 9.37.5.158, is no longer available. Furthermore, the table as illustrated in Table 1 may be updated to indicate the period of time, e.g., 200 seconds, the selected IP address, IP address 9.37.5.158, is valid. Upon expiration of the IP address, the IP address may be returned to the pool of available IP addresses as discussed in FIG. 5. By limiting the time an IP address is valid, IP addresses may be dynamically shared among a larger number of servers 102. Upon assigning an IP address to a particular server 102, e.g., server 102D, a background process may be performed by DNSCM 104 to monitor the time to expire for each assigned IP address in order to maintain an adequate number of available IP addresses as discussed in FIG. 5. Other background processes performed by DNSCM 104 in order to maintain an adequate number of available IP addresses are discussed in FIGS. 6–7. Further, the table as illustrated in Table 1 may be updated to indicate the particular server 102, e.g., server 102D, that is assigned the selected IP address, e.g., IP address 9.37.5.158, since it hosts the web site for the domain name, e.g., domain3.com, entered by the user of client 101. Further, the table may be updated to indicate the non-routable IP address, e.g., IP address 10.1.1.14, for server 102, e.g., server 102D, assigned the selected IP address.

In step 406, the selected IP address, e.g., IP address 9.37.5.158, along with the period of time, e.g., 200 seconds, the selected IP address, e.g., IP address 9.37.5.158, is valid may be transmitted to client 101, e.g., client 101A, that transmitted the request for an IP address in step 401.

Referring to step 403, if the domain name, e.g., domain1.com, entered by the user of client 101, e.g., client 101A, was assigned an IP address, e.g., IP address 9.37.5.129, then a determination may be made in step 407 as to whether the domain name entered by the user of client 101 was assigned multiple IP addresses.

If the domain name, e.g., domain1.com, entered by the user of client 101 was assigned only a single IP address, e.g., IP address 9.37.5.129, then the period of time the assigned IP address is valid may be adjusted in step 408. For example, if the user of client 101 entered the domain name domain1.com via web browser 105, then DNSCM 104 may determine that a single IP address 9.37.5.129 is assigned to server 102A that hosts the web site for domain1.com as illustrated Table 1. The period of time to expire for the IP address 9.37.5.129 may then be adjusted by increasing an additional period of time, e.g., 60 seconds, to the period of time set to expire, e.g., 200 seconds, for IP address 9.37.5.129. Upon expiration of the IP address, the IP address may be returned to the pool of available IP addresses as discussed in FIG. 5. By limiting the time an IP address is valid, IP addresses may be dynamically shared among a larger number of servers 102. As stated above, upon assigning an IP address, e.g., IP address 9.37.5.129, to a particular server 102, e.g., server 102A, a background process may be performed by DNSCM 104 to monitor the time to expire for each assigned IP address in order to maintain an adequate number of available IP addresses as discussed in FIG. 5. Other background processes performed by DNSCM 104 in order to maintain an adequate number of available IP addresses are discussed in FIGS. 6–7.

In step 409, DNSCM 104 may transmit the IP address, e.g., IP address 9.37.5.129, assigned to server 102 that hosts the web site for the domain name entered by the user of client 101 as well as the adjusted period of time, e.g., 260 seconds, the IP address, e.g., IP address 9.37.5.129, is valid.

If the domain name, e.g., domain1.com, entered by the user of client 101 was assigned multiple IP addresses, e.g., IP addresses 9.37.5.130, 9.37.5.142, as illustrated in Table 1, then one of the multiple IP addresses may be selected in step 410 based on the load of servers 102, e.g., server 102B, server 102C, that host the web site of the domain name, e.g., domain2.com, entered by the user via web browser 105. That is, one of the multiple IP addresses may be selected in step 410 based on the number of requests issued to each server 102, e.g., server 102B, server 102C, that hosts the web site of the domain name, e.g., domain2.com, entered by the user via web browser 105. The IP address, e.g., IP address 9.37.5.130, assigned to server 102, e.g., server 102B, that receives the least number of requests may be selected. In step 411, the period of time to expire for the selected IP address, e.g., IP address 9.37.5.130, may then be adjusted by increasing an additional period of time, e.g., 60 seconds, to the period of time set to expire, e.g., 78 seconds, for the selected IP address. It is noted that upon expiration of the selected IP address, e.g., IP address 9.37.5.130, the selected IP address may be returned to the pool of available IP addresses as discussed in FIG. 5. By limiting the time an IP address is valid, IP addresses may be dynamically shared among a larger number of servers 102. It is further noted that upon assigning an IP address, e.g., IP address 9.37.5.130, to a particular server 102, e.g., server 102B, a background process may be performed by DNSCM 104 to monitor the time to expire for each assigned IP address in order to maintain an adequate number of available IP addresses as discussed in FIG. 5. Other background processes performed by DNSCM 104 in order to maintain an adequate number of available IP addresses are discussed in FIGS. 6–7.

In step 412, DNSCM 104 may transmit the selected IP address, e.g., IP address 9.37.5.130, assigned to server 102, e.g., server 102B, that hosts the web site for the domain name, e.g., domain2.com, entered by the user of client 101 as well as the adjusted period of time, e.g., 138 seconds, that the selected IP address, e.g., IP address 9.37.5.130, is valid.

Upon transmitting an IP address along with the period of time the transmitted IP address has till it expires in steps 406, 409, 412, DNSCM 104 may receive in step 413 a request to access server 102, e.g., server 102A, hosting the web site of the domain name, e.g., domain1.com, entered by the user of client 101 along with the assigned IP address, e.g., IP address 9.37.5.129. The request may comprise the address of client 101 that issued the request. In step 414, DNSCM 104 may translate the IP address, e.g., IP address 9.37.5.129, assigned to server 102, server 102A, hosting the web site of the domain name, e.g., domain1.com, entered by the user of client 101 to the corresponding non-routable IP address, e.g., IP address 10.1.1.11.

In step 415, DNSCM 104 may receive a packet of data for reading and executing web pages along with the non-routable IP address, e.g., IP address 10.1.1.11, assigned to server 102, e.g., server 102A, hosting the web site for the domain name, e.g., domain1.com, entered by the user of client 101 from that server 102, e.g., server 102A. The packet of data may further comprise the source address used for identifying which client 101 is to receive the packet of data. In step 416, DNSCM 104 may translate the non-routable IP address, e.g., IP address 10.1.1.11, assigned to server 102, server 102A, hosting the web site of the domain name, e.g., domain1.com, entered by the user of client 101 to the corresponding routable IP address, e.g., IP address 9.37.5.129. In step 417, the packet of data along with the routable IP address, e.g., IP address 9.37.5.129, assigned to server 102, e.g., server 102A, that hosts the web site for the domain name, e.g., domain1.com, entered by the user of client 101 may be transmitted to the appropriate client 101 based on the source address.

It is noted that method 400 may be executed in a different order presented and that the order presented in the discussion of FIG. 4 is illustrative. It is further noted that certain steps in method 400 may be executed almost concurrently.

Figure 5:
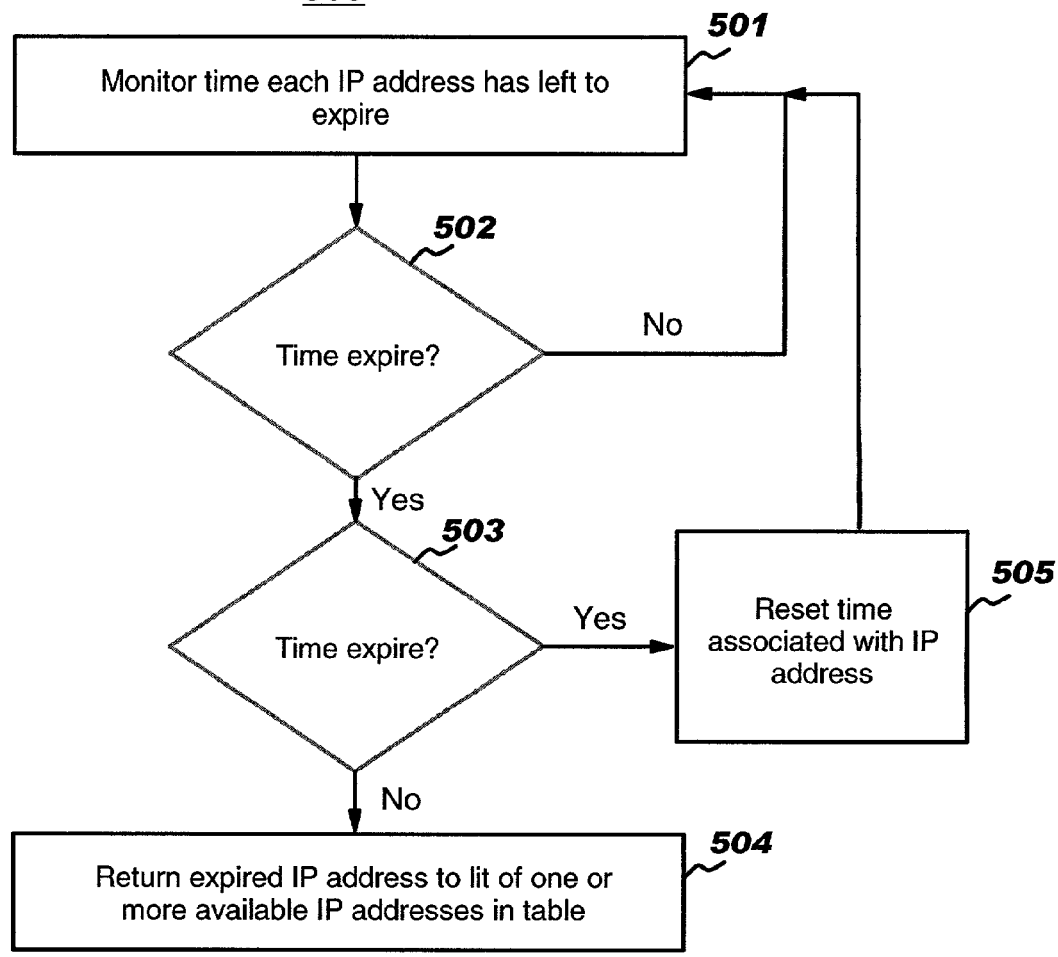
FIG. 5 is a flowchart of a method for maintaining an adequate supply of available IP addresses by monitoring the time to expire for each assigned IP address in accordance with the present invention.

FIG. 5—Flowchart of a Method for Maintaining an Adequate Supply of Available IP Addresses by Monitoring the Time to Expire for Each Assigned IP Address FIG. 5 illustrates a method 500 for maintaining an adequate supply of available IP addresses. As stated above, DNSCM 104 may perform background processes in which one background process may maintain an adequate supply of available IP addresses by monitoring the period of time to expire for each assigned IP address as discussed below in method 500.

In step 501, DNSCM 104 (FIGS. 1 and 3) may monitor the time each assigned IP address, e.g., IP addresses 9.37.5.129, 9.37.5.130, 9.37.5.142, has left to expire as illustrated in Table 1.

A determination may then be made in step 502 by DNSCM 104 as to whether any assigned IP address has expired. If none of the assigned IP addresses has expired, then DNSCM 104 may continue to monitor the time each assigned IP address has left to expire in step 501. If an assigned IP address has expired then the following steps 503–505 may occur for each assigned IP address that has expired.

In step 503, a determination may be made by DNSCM 104 as to whether the connection between server 102, e.g., server 102, assigned the IP address that expired and the client 101 that issued the request for the IP address that expired is a persistent connection, e.g., File Transfer Protocol (FTP) connection, Telnet connection. If the connection is not persistent, then the expired IP address may be returned to the listing of one or more available IP addresses in step 504. If the connection is persistent, then the period of time the IP address is valid may be reset, e.g., set period of time to expire to 200 seconds, in step 505.

It is noted that method 500 may be executed in a different order presented and that the order presented in the discussion of FIG. 5 is illustrative. It is further noted that certain steps in method 500 may be executed almost concurrently. Another background process enacted by DNSCM 104 to maintain an adequate supply of available IP addresses is discussed below in FIG. 6.

Figure 6:
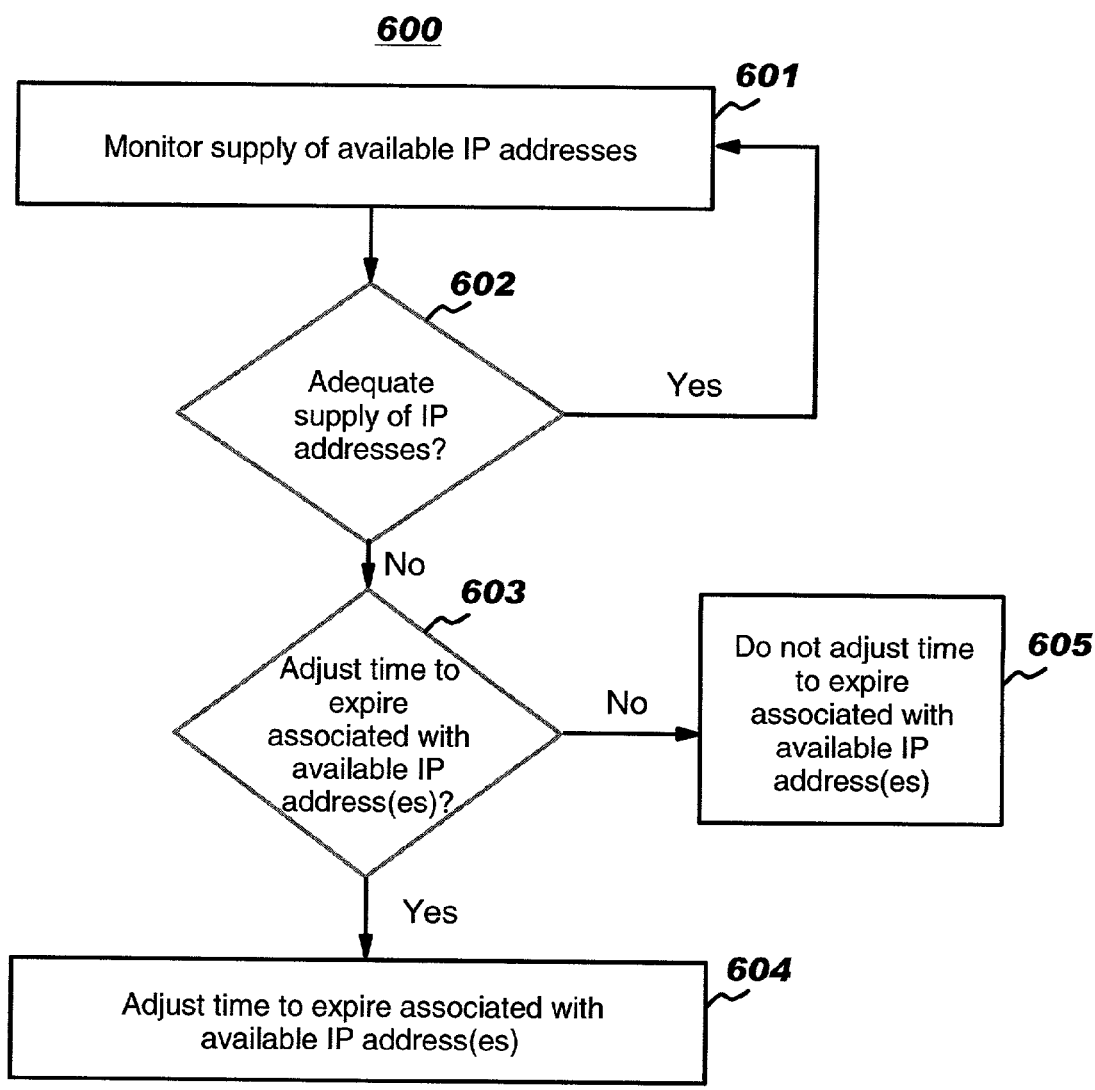
FIG. 6 is a flowchart of a method for maintaining an adequate supply of available IP addresses by adjusting the time one or more IP addresses are valid in accordance with the present invention.

FIG. 6—Flowchart of Another Method for Maintaining an Adequate Supply of Available IP Addresses by Adjusting the Time One or More IP Addresses are Valid FIG. 6 illustrates another method 600 for maintaining an adequate supply of available IP addresses by adjusting the time one or more IP addresses are valid.

In step 601, DNSCM 104 (FIGS. 1 and 3) may monitor the supply of available IP addresses, e.g., IP addresses 9.37.5.158, 9.37.5.160, as illustrated in Table 1. In step 602, a determination may be made as to whether there is an adequate supply of available IP addresses. If there is an adequate supply of available IP addresses, then DNSCM 104 may continue to monitor the supply of available IP addresses in step 601. If there is not an adequate supply of available IP addresses, then DNSCM 104 may determine in step 603 as to whether to adjust the time to expire for one or more available IP addresses.

If DNSCM 104 determined to adjust the time to expire for one or more available IP addresses, then DNSCM 104 may adjust the time to expire for one or more available IP addresses in step 604. If DNSCM 104 determined not to adjust the time to expire for any available IP addresses, then the time to expire may not be adjusted for any of the available IP addresses in step 605.

It is noted that method 600 may be executed in a different order presented and that the order presented in the discussion of FIG. 6 is illustrative. It is further noted that certain steps in method 600 may be executed almost concurrently. Another background process enacted by DNSCM 104 to maintain an adequate supply of available IP addresses is discussed below in FIG. 7.

Figure 7:
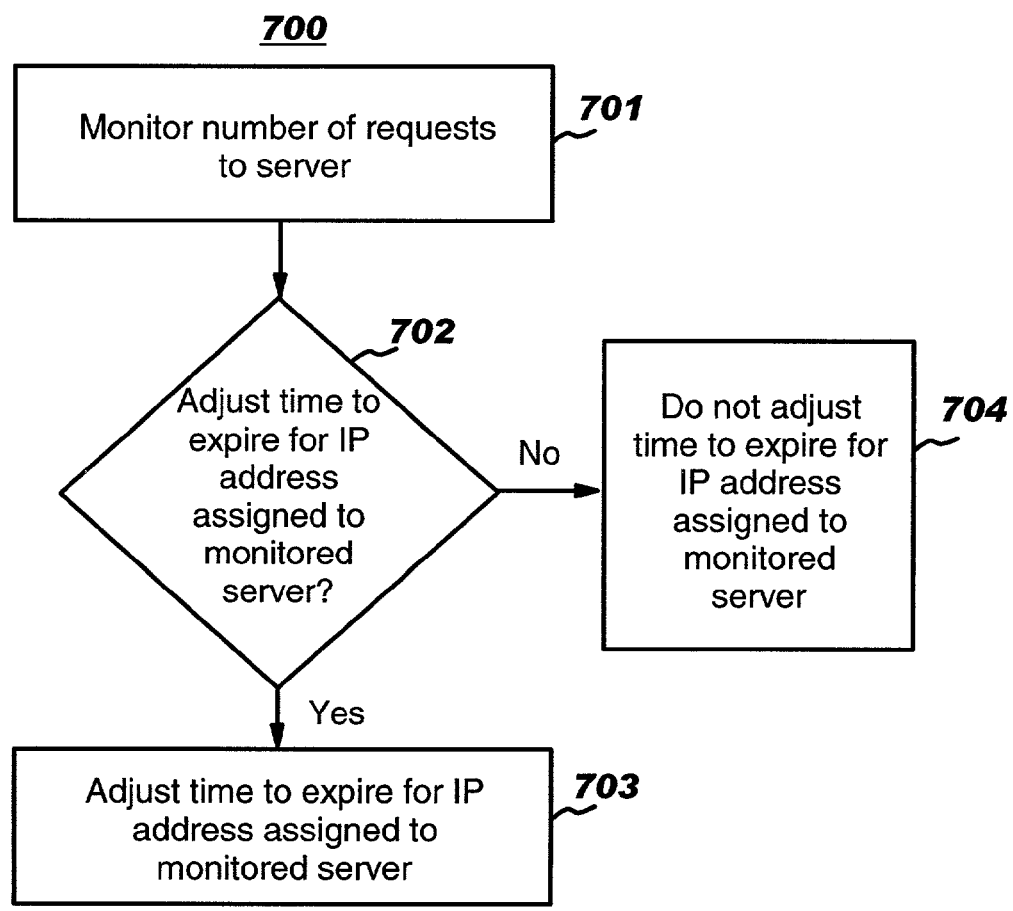
FIG. 7 is a flowchart of a method for method for maintaining an adequate supply of available IP addresses by adjusting the time an IP address is valid based on the number of requests received by the server assigned that IP address.

FIG. 7—Flowchart of Another Method for Maintaining an Adequate Supply of Available IP Addresses by Adjusting the Time an IP Address is Valid Based on the Number of Requests Received by the Server Assigned that IP Address FIG. 7 illustrates another method 700 for maintaining an adequate supply of available IP addresses by adjusting the time an IP address is valid based on the number of requests received by the server assigned that IP address.

In step 701, DNSCM 104 (FIGS. 1 and 3) may monitor the number of requests received by server 102, e.g., server 102A. In step 702, a determination may be made as to whether to adjust the time to expire for the IP address assigned to the monitored server 102 based on the number of received requests.

If the monitored server 102 has received a number of requests deemed to cause DNSCM 104 to adjust the time to expire for the IP address assigned to that server 102, e.g., server 102A, then DNSCM 104 may adjust the time to expire for the IP address assigned to that server 120 in step 703.

If the monitored server 102 has received a number of requests deemed to cause DNSCM 104 to not adjust the time to expire for the IP address assigned to that server 102, e.g., server 102A, then DNSCM 104 may not adjust the time to expire for the IP address assigned to that server 120 in step 704.

It is noted that method 700 may be executed in a different order presented and that the order presented in the discussion of FIG. 7 is illustrative. It is further noted that certain steps in method 700 may be executed almost concurrently.

Although the system, method and computer program product are described in connection with several embodiments, it is not intended to be limited to the specific forms set forth herein, but on the contrary, it is intended to cover such alternatives, modifications and equivalents, as can be reasonably included within the spirit and scope of the invention as defined by the appended claims. It is noted that the headings are used only for organizational purposes and not meant to limit the scope of the description or claims.

What is claimed is:

1. A method for dynamically sharing a limited supply of Internet Protocol (IP) addresses among a larger number of servers comprising the steps of:
   receiving a request for an IP address associated with a domain name;
   searching a table comprising a listing of one or more available IP addresses;
   selecting an IP address from said one or more available IP addresses in said table if said domain is not assigned a particular IP address, wherein said selected IP address is valid for a predetermined period of time; and
   returning said selected IP address to said listing of one or more available IP addresses upon expiration of said predetermined period of time and determining that there does not exist a persistent connection with a server hosting a web site of said domain name.

2. The method as recited in claim 1, wherein if said domain name is assigned said particular IP address, then the method further comprises the steps of
   adjusting a predetermined period of time said particular IP address is valid; and
   transmitting said particular IP address along with said updated period of time said particular IP address is valid.

3. The method as recited in claim 2 further comprising the steps of:
   receiving a request to access said server hosting said web site of said domain name with said particular IP address; and
   translating said particular IP address into a non-routable IP address associated with said server hosting said web site of said domain name.

4. The method as recited in claim 3 further comprising the steps of:
   receiving a packet of data and said non-routable IP address from said server; and
   translating said non-routable IP address into said particular IP address.

5. The method as recited in claim 4 further comprising the step of:
   transmitting said received packet of data with said particular IP address.

6. The method as recited in claim 1, wherein if said domain name is assigned multiple IP addresses, then the method further comprises the steps of:
   selecting an IP address from said multiple IP addresses based on a number of requests to each server assigned with an IP address of said multiple IP addresses;
   adjusting a predetermined period of time of said selected IP address from said multiple IP addresses that said selected IP address is valid; and
   transmitting said selected IP address from said multiple IP addresses along with said updated period of time said selected IP address is valid.

7. The method as recited in claim 6 further comprising the steps of:
   receiving a request to access said server hosting said web site of said domain name with said selected IP address from said multiple IP addresses; and
   translating said selected IP address from said multiple IP addresses into a non-routable IP address associated with said server hosting said web site of said domain name.

8. The method as recited in claim 7 further comprising the steps of:
   receiving a packet of data and said non-routable IP address from said server, wherein said non-routable IP address is associated with said selected IP address from said multiple IP addresses; and
   translating said non-routable IP address into said selected IP address from said multiple IP addresses.

9. The method as recited in claim 8 further comprising the step of:
   transmitting said received packet of data with said selected IP address from said multiple IP addresses.

10. The method as recited in claim 1 further comprising the steps of:
    updating said table to indicate that said selected IP address is no longer available; and
    transmitting said selected IP address along with a predetermined period of time said selected IP address is valid.

11. The method as recited in claim 10 further comprising the steps of:
    receiving a request to access said server hosting said web site of said domain name with said selected IP address; and
    translating said selected IP address into a non-routable IP address associated with said server hosting said web site of said domain name.

12. The method as recited in claim 11 further comprising the steps of:
    receiving a packet of data and said non-routable IP address from said server; and
    translating said non-routable IP address into said selected IP address.

13. The method as recited in claim 12 further comprising the step of:
   transmitting said received packet of data with said selected IP address.
14. The method as recited in claim 1 further comprising the steps of:
   monitoring said predetermined period of time said selected IP address is valid; and
   determining if there exists a persistent connection with said server hosting said web site of said domain name upon expiration of said predetermined period of time.
15. The method as recited in claim 14 further comprising the step of:
   resetting said predetermined period of time said selected IP address is valid if there exists a persistent connection with said server hosting said web site of said domain name.
16. The method as recited in claim 2 further comprising the steps of:
   monitoring said adjusted predetermined period of time said particular IP address is valid; and
   determining if there exists a persistent connection with said server hosting said web site of said domain name upon expiration of said adjusted predetermined period of time.
17. The method as recited in claim 16 further comprising the step of:
   returning said particular IP address to said listing of one or more available IP addresses if there does not exist a persistent connection with said server hosting said web site of said domain name.
18. The method as recited in claim 16 further comprising the step of:
   resetting said adjusted predetermined period of time of said particular IP address if there exists a persistent connection with said server hosting said web site of said domain name.
19. The method as recited in claim 6 further comprising the steps of:
   monitoring said adjusted predetermined period of time said selected IP address from said multiple IP addresses is valid; and
   determining if there exists a persistent connection with said server hosting said web site of said domain name upon expiration of said adjusted predetermined period of time.
20. The method as recited in claim 19 further comprising the step of:
   returning said selected IP address from said multiple IP addresses to said listing of one or more available IP addresses if there does not exist a persistent connection with said server hosting said web site of said domain name.
21. The method as recited in claim 19 further comprising the step of:
   resetting said adjusted predetermined period of time of said selected IP address from said multiple IP addresses if there exists a persistent connection with said server hosting said web site of said domain name.
22. The method as recited in claim 1 further comprising the steps of:
   monitoring said listing of one or more available IP addresses; and
   adjusting one or more predetermined period of times associated with one or more available IP addresses if there is not an adequate listing of one or more available IP addresses.

23. The method as recited in claim 1 further comprising the steps of:
   monitoring a number of requests to said server hosting said web site of said domain name; and
   adjusting a predetermined period of time associated with an IP address assigned to said server based on said number of requests to said server.
24. A system, comprising:
   a plurality of servers configured to host one or more web sites; and
   a manager coupled to said plurality of servers, wherein said manager is configured to map domain name into corresponding Internet Protocol (IP) addresses, wherein said manager comprises:
      a memory unit operable for storing a computer program operable for dynamically sharing a limited supply of Internet Protocol (IP) addresses among a larger number of said plurality of server of servers; and
      a processor coupled to said memory unit, wherein said processor, responsive to said computer program, comprises:
         circuitry operable for receiving a request for an IP address associated with a domain name;
         circuitry operable for searching a table comprising a listing of one or more available IP addresses;
         circuitry operable for selecting an IP address from said one or more available IP addresses in said table if said domain is not assigned a particular IP address, wherein said selected IP address is valid for a predetermined period of time; and
         circuitry operable for returning said selected IP address to said listing of one or more available IP addresses upon expiration of said predetermined period of time and determining that there does not exist a persistent connection with a server of said plurality of servers hosting a web site of said domain name.
25. The system as recited in claim 24, wherein if said domain name is assigned said particular IP address, then said manager further comprises:
   circuitry operable for adjusting a predetermined period of time said particular IP address is valid; and
   circuitry operable for transmitting said particular IP address along with said updated period of time said particular IP address is valid.
26. The system as recited in claim 25, wherein said manager further comprises:
   circuitry operable for receiving a request to access said server of said plurality of servers hosting said web site of said domain name with said particular IP address; and
   circuitry operable for translating said particular IP address into a non-routable IP address associated with said server of said plurality of servers hosting said web site of said domain name.
27. The system as recited in claim 26, wherein said manager further comprises:
   circuitry operable for receiving a packet of data and said non-routable IP address from said server of said plurality of servers; and
   circuitry operable for translating said non-routable IP address into said particular IP address.
28. The system as recited in claim 27, wherein said manager further comprises:
   circuitry operable for transmitting said received packet of data with said particular IP address.

29. The system as recited in claim 24, wherein if said domain name is assigned multiple IP addresses, then said manager further comprises:
circuitry operable for selecting an IP address from said multiple IP addresses based on a number of requests to each server of said plurality of servers assigned with an IP address of said multiple IP addresses;
circuitry operable for adjusting a predetermined period of time of said selected IP address from said multiple IP addresses that said selected IP address is valid; and
circuitry operable for transmitting said selected IP address from said multiple IP addresses along with said updated period of time said selected IP address is valid.

30. The system as recited in claim 29, wherein said manager further comprises:
circuitry operable for receiving a request to access said server of said plurality of servers hosting said web site of said domain name with said selected IP address from said multiple IP addresses; and
circuitry operable for translating said selected IP address from said multiple IP addresses into a non-routable IP address associated with said server of said plurality of servers hosting said web site of said domain name.

31. The system as recited in claim 29, wherein said manager further comprises:
circuitry operable for receiving a packet of data and said non-routable IP address from said server of said plurality of servers, wherein said non-routable IP address is associated with said selected IP address from said multiple IP addresses; and
circuitry operable for translating said non-routable IP address into said selected IP address from said multiple IP addresses.

32. The system as recited in claim 31, wherein said manager further comprises:
circuitry operable for transmitting said received packet of data with said selected IP address from said multiple IP addresses.

33. The system as recited in claim 24, wherein said manager further comprises:
circuitry operable for updating said table to indicate that said selected IP address is no longer available; and
circuitry operable for transmitting said selected IP address along with a predetermined period of time said selected IP address is valid.

34. The system as recited in claim 33, wherein said manager further comprises:
circuitry operable for receiving a request to access said server of said plurality of servers hosting said web site of said domain name with said selected IP address; and
circuitry operable for translating said selected IP address into a non-routable IP address associated with said server of said plurality of servers hosting said web site of said domain name.

35. The system as recited in claim 34, wherein said manager further comprises:
circuitry operable for receiving a packet of data and said non-routable IP address from said server of said plurality of servers; and
circuitry operable for translating said non-routable IP address into said selected IP address.

36. The system as recited in claim 35, wherein said manager further comprises:
circuitry operable for transmitting said received packet of data with said selected IP address.

37. The system as recited in claim 24, wherein said manager further comprises:
circuitry operable for monitoring said predetermined period of time said selected IP address is valid; and
circuitry operable for determining if there exists a persistent connection with said server of said plurality of servers hosting said web site of said domain name upon expiration of said predetermined period of time.

38. The system as recited in claim 37, wherein said manager further comprises:
circuitry operable for resetting said predetermined period of time said selected IP address is valid if there exists a persistent connection with said server of said plurality of servers hosting said web site of said domain name.

39. The system as recited in claim 25 further comprises:
circuitry operable for monitoring said adjusted predetermined period of time said particular IP address is valid; and
circuitry operable for determining if there exists a persistent connection with said server of said plurality of servers hosting said web site of said domain name upon expiration of said adjusted predetermined period of time.

40. The system as recited in claim 39, wherein said manager further comprises:
circuitry operable for returning said particular IP address to said listing of one or more available IP addresses if there does not exist a persistent connection with said server of said plurality of servers hosting said web site of said domain name.

41. The system as recited in claim 39, wherein said manager further comprises:
circuitry operable for resetting said adjusted predetermined period of time of said particular IP address if there exists a persistent connection with said server of said plurality of servers hosting said web site of said domain name.

42. The system as recited in claim 29, wherein said manager further comprises:
circuitry operable for monitoring said adjusted predetermined period of time said selected IP address from said multiple IP addresses is valid; and
circuitry operable for determining if there exists a persistent connection with said server of said plurality of servers hosting said web site of said domain name upon expiration of said adjusted predetermined period of time.

43. The system as recited in claim 42, wherein said manager further comprises:
circuitry operable for returning said selected IP address from said multiple IP addresses to said listing of one or more available IP addresses if there does not exist a persistent connection with said server of said plurality of servers hosting said web site of said domain name.

44. The system as recited in claim 42, wherein said manager further comprises:
circuitry operable for resetting said adjusted predetermined period of time of said selected IP address from said multiple IP addresses if there exists a persistent connection with said server of said plurality of servers hosting said web site of said domain name.

45. The system as recited in claim 24, wherein said manager further comprises:
circuitry operable for monitoring said listing of one or more available IP addresses; and
circuitry operable for adjusting one or more predetermined period of times associated with one or more available IP addresses if there is not an adequate listing of one or more available IP addresses.

46. The system as recited in claim 24, wherein said manager further comprises:
   circuitry operable for monitoring a number of requests to said server of said plurality of servers hosting said web site of said domain name; and
   circuitry operable for adjusting a predetermined period of time associated with an IP address assigned to said server of said plurality of servers based on said number of requests to said server of said plurality of servers hosting said web site of said domain name.

47. A computer program product embodied in a machine readable medium for dynamically sharing a limited supply of Internet Protocol (IP) addresses among a larger number of servers comprising the programming steps of:
   receiving a request for an IP address associated with a domain name;
   searching a table comprising a listing of one or more available IP addresses;
   selecting an IP address from said one or more available IP addresses in said table if said domain is not assigned a particular IP address, wherein said selected IP address is valid for a predetermined period of time; and
   returning said selected IP address to said listing of one or more available IP addresses upon expiration of said predetermined period of time and determining that there does not exist a persistent connection with a server hosting a web site of said domain name.

48. The computer program product as recited in claim 47, wherein if said domain name is assigned said particular IP address, then the computer program product further comprises the programming steps of:
   adjusting a predetermined period of time said particular IP address is valid; and
   transmitting said particular IP address along with said updated period of time said particular IP address is valid.

49. The computer program product as recited in claim 48 further comprising the programming steps of:
   receiving a request to access said server hosting said web site of said domain name with said particular IP address; and
   translating said particular IP address into a non-routable IP address associated with said server hosting said web site of said domain name.

50. The computer program product as recited in claim 49 further comprising the programming steps of:
   receiving a packet of data and said non-routable IP address from said server; and
   translating said non-routable IP address into said particular IP address.

51. The computer program product as recited in claim 50 further comprising the programming step of:
   transmitting said received packet of data with said particular IP address.

52. The computer program product as recited in claim 47, wherein if said domain name is assigned multiple IP addresses, then the computer program product further comprises the programming steps of:
   selecting an IP address from said multiple IP addresses based on a number of requests to each server assigned with an IP address of said multiple IP addresses;
   adjusting a predetermined period of time of said selected IP address from said multiple IP addresses that said selected IP address is valid; and
   transmitting said selected IP address from said multiple IP addresses along with said updated period of time said selected IP address is valid.

53. The computer program product as recited in claim 52 further comprising the programming steps of:
   receiving a request to access said server hosting said web site of said domain name with said selected IP address from said multiple IP addresses; and
   translating said selected IP address from said multiple IP addresses into a non-routable IP address associated with said server hosting said web site of said domain name.

54. The computer program product as recited in claim 53 further comprising the programming steps of:
   receiving a packet of data and said non-routable IP address from said server, wherein said non-routable IP address is associated with said selected IP address from said multiple IP addresses; and
   translating said non-routable IP address into said selected IP address from said multiple IP addresses.

55. The computer program product as recited in claim 54 further comprising the programming step of:
   transmitting said received packet of data with said selected IP address from said multiple IP addresses.

56. The computer program product as recited in claim 47 further comprising the programming steps of:
   updating said table to indicate that said selected IP address is no longer available; and
   transmitting said selected IP address along with a predetermined period of time said selected IP address is valid.

57. The computer program product as recited in claim 46 further comprising the programming steps of:
   receiving a request to access said server hosting said web site of said domain name with said selected IP address; and
   translating said selected IP address into a non-routable IP address associated with said server hosting said web site of said domain name.

58. The computer program product as recited in claim 57 further comprising the programming steps of:
   receiving a packet of data and said non-routable IP address from said server; and
   translating said non-routable IP address into said selected IP address.

59. The computer program product as recited in claim 58 further comprising the programming step of:
   transmitting said received packet of data with said selected IP address.

60. The computer program product as recited in claim 47 further comprising the programming steps of:
   monitoring said predetermined period of time said selected IP address is valid; and
   determining if there exists a persistent connection with said server hosting said web site of said domain name upon expiration of said predetermined period of time.

61. The computer program product as recited in claim 60 further comprising the programming step of:
   resetting said predetermined period of time said selected IP address is valid if there exists a persistent connection with said server hosting said web site of said domain name.

62. The computer program product as recited in claim 48 further comprising the programming steps of:
   monitoring said adjusted predetermined period of time said particular IP address is valid; and
   determining if there exists a persistent connection with said server hosting said web site of said domain name upon expiration of said adjusted predetermined period of time.

63. The computer program product as recited in claim 62 further comprising the programming step of:
    returning said particular IP address to said listing of one or more available IP addresses if there does not exist a persistent connection with said server hosting said web site of said domain name.

64. The computer program product as recited in claim 62 further comprising the programming step of:
    resetting said adjusted predetermined period of time of said particular IP address if there exists a persistent connection with said server hosting said web site of said domain name.

65. The computer program product as recited in claim 52 further comprising the programming steps of:
    monitoring said adjusted predetermined period of time said selected IP address from said multiple IP addresses is valid; and
    determining if there exists a persistent connection with said server hosting said web site of said domain name upon expiration of said adjusted predetermined period of time.

66. The computer program product as recited in claim 65 further comprising the programming step of:
    returning said selected IP address from said multiple IP addresses to said listing of one or more available IP addresses if there does not exist a persistent connection with said server hosting said web site of said domain name.

67. The computer program product as recited in claim 65 further comprising the programming step of:
    resetting said adjusted predetermined period of time of said selected IP address from said multiple IP addresses if there exists a persistent connection with said server hosting said web site of said domain name.

68. The computer program product as recited in claim 47 further comprising the programming steps of:
    monitoring said listing of one or more available IP addresses; and
    adjusting one or more predetermined period of times associated with one or more available IP addresses if there is not an adequate listing of one or more available IP addresses.

69. The computer program product as recited in claim 47 further comprising the programming steps of:
    monitoring a number of requests to said server hosting said web site of said domain name; and
    adjusting a predetermined period of time associated with an IP address assigned to said server based on said number of requests to said server.

\* \* \* \* \*